G. ESTERLY.
Mowing Machine.
No. 16,971. Patented April 7, 1857.
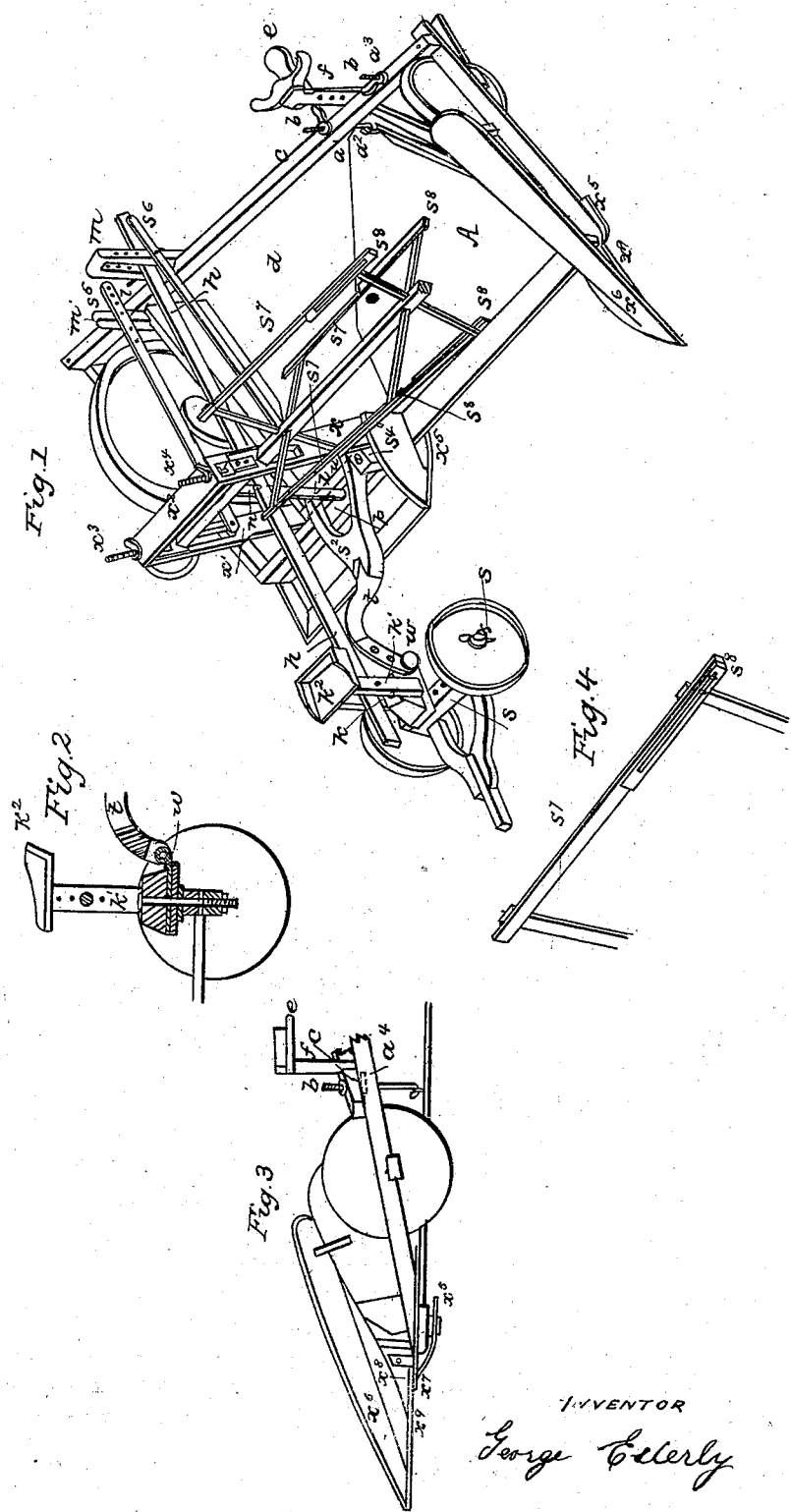
INVENTOR
George Esterly

UNITED STATES PATENT OFFICE.

GEO. ESTERLY, OF HEART PRAIRIE, WISCONSIN.

IMPROVEMENT IN REAPING-MACHINES.

Specification forming part of Letters Patent No. 16,971, dated April 7, 1857.

*To all whom it may concern:*

Be it known that I, GEORGE ESTERLY, of Heart Prairie, in the county of Walworth and State of Wisconsin, have invented certain Improvements in Reaping and Mowing Machines; and I do hereby declare that the following is a full, clear, and exact description of the principle or character which distinguishes them from all other things before known, and of the usual manner of making, modifying, and using the same, reference being had to the annexed drawings, of which—

Figure 1 represents a perspective view of the harvester; Fig. 2, a sectional and detached view of the front axle and driver's seat; Fig. 3, a side view of the dividers, also showing the shoe-piece; Fig. 4, a detached view of part of the reel, showing the mode of adjusting.

My invention consists in a peculiar combination of the platform, raker's seat or stand, and common supporting-beam in machines for reaping, as hereinafter set forth.

In order to accommodate the raker and give the proper elevation to the platform A, I make it adjustable in the following manner: The platform A is hung upon two rods, $b\cdot b$, which pass through the cross-beam $c$, which extends from side to side of the machine. These rods are adjusted up and down by means of screws on the rods and the nuts $a'$ $a^2$ $a^3$ $a^4$ above and below the beam. The proper pitch of the platform A being determined, the nuts are screwed fast and the platform held in position, it being understood that the rear parts should be lower than the front, and either corner of the platform may be dropped and held in such position while the grain is raked from the platform into space $d$. The raker's seat $e$ is connected with the beam $c$ by an adjustable support, $f$. Thus the raker's seat and the platform are both adjustable to and from the beam and each other by independent and firm connections with the beam, so as to accommodate different rakers. The raising, lowering, and adjusting of the front of the machine are effected by means of lever $h$ and connecting or lifting bar $i$. This lever extends from front to rear of the machine, and has two points of support—viz., the friction-roller bar $k$ between the supports $k'$ of the driver's seat $k^2$ and the pin or bolts $l$ in the gallows-frame $m$ on the beam $c$. The lifting-bar $i$ passes through a slot in this lever, and by the transverse bolt $n$ passing through it above lever $h$ the weight of the front part of the machine is brought upon the lever. This bar is perforated with several holes to admit of several adjustments of the height of the front of the machine. The lifting-bar is connected to the sill $p$ of the machine by a strong hook or loop. It will be seen that the driver, sitting on his seat $p^2$, can, when necessary, raise the front end of the lever and raise up the front of the machine to surmount an obstacle, and suffer it to drop again upon its bearing $k'$.

It will be seen that by making the lifting-bar $i$ adjustable the necessary raising and lowering of the machine by the driver can be effected without increasing the range of that end of the lever which is under the driver's seat. The driver's seat $k^2$ is placed directly over the front axle, $s$, and in order to give stability to his seat, and at the same time to admit of the proper working position and bearings of the lever $h$, and also to relieve the horses from the weight of the machine, the reach $t$ is jointed at $u$, and also at $w$. The tongue is stiff or without working-joints, and connected firmly with the forward axle, and the driver's seat $k^2$ is elevated directly over the front axle upon the two supports $k'$, and the weight of the seat and driver is borne by the front axle. Between the supports $k'$ is the friction-roller bar upon which the lever $h$ rests, and it will be seen that, this end of the lever being subject to slight movements back and forth, it is important that it should move without wear and friction. It will be seen that the positions and bearings of the lever $h$ bring the weight of the machine into line with the lever and its bearings and divide the strain equally upon the middle of the forward axle, and, what is very important, bring the weight into the line of the draft of the horses. It will be seen that the effect of the arrangement of the joint of the reach in rear of the axle and the joint over which the driver's seat is placed, and about which the tongue and axle turn horizontally, is to prevent the straining and opening of this latter joint, which would be the case without the joint in the reach.

I have built machines with the standards of the driver's seat bolted on the end of the reach connecting the axle and sill of the machine, the standards being on the forward end and immediately behind the axle, between which the lever worked on a stationary bolt, and found great difficulty in the tongue being cramped, as it must of necessity be stiff in the axle or the driver's seat could not be held in its place, and also in raising and lowering the machine by the lever the driver had to lift a part at least of his own weight, and the joints always being more or less strained and necessarily working much harder and racking the machine more than by the above arrangement.

The reel is hung upon two posts, $x$ $x'$, so situated as to divide the weight of the reel and standards equally on either side of the line of draft. These posts are supported and turn upon a bolt or axis, $a$, which passes through the inner side timber, through the hounds $s^3$ of the reach, and through the ear piece or block $s^4$. The reel-posts are held in position and are adjusted back and forth by means of the jointed arms $s^5$ $s^6$ and standards $m$ and $m'$. The posts are connected at top by a cross-piece, $x^2$, which sustains the adjustable bearings $x^3$ $x^4$ of the reel-posts. This cross-piece dispenses with the necessity of cross-braces below and gives free room for the lever $h$ to work up and down.

For the purpose of allowing the gathering-arms of the reel to work as close to the finger-board as is required in very short grain, and also to allow them to be extended over the divider when required, I attach to the gathering arms $s^7$ $s^7$ $s^7$ $s^7$ adjustable gathering-pieces $s^8$, provided with suitable slots and set-screws, as shown in the drawings in Fig. 4. It sometimes becomes necessary to lower the cut of the machine below that which is usually contemplated, and for that purpose I make the shoes $x^5$ $x^5$ adjustable by any well-known means, and as it is necessary in such cases that a short divider should be used, I make the divider $x^6$ removable, and this, when removed, brings into operation the short divider $x^7$, the upper or upright portion, $x^8$, of which passes through the shoe-piece $x^9$ of the removable divider, and the lower portion of which, attached to the sill of the machine, serves as a support for the removable divider. The adjustment of the shoe-pieces will of course require a corresponding adjustment of the lever. I have used one support connecting the rear end of the platform to the beam C, and found a great difficulty in its canting sidewise up and down by more weight being placed on one foot than the other. By thus suspending the platform A to the beam $c$ by adjusting-rods said platform may be adjusted and then held at such height or inclination as may suit the ground passed over or the convenience of the raker upon the platform; and the raker, while the machine is in motion and he upon the platform, may raise or lower or change the inclination of the platform at pleasure or to suit the circumstances of the case, and hold it at such adjusted point by the nuts on either side of the beam $c$. The seat or stand $e$ has a separate adjustment on the beam $c$ from that of the platform; but both adjustments can be so made as to give the raker the greatest comfort in position and ease for clearing the platform.

Having thus fully described the nature of my invention, I would state that I do not wish to be understood as claiming in this application the use of an adjustable raker's seat or stand attached to a swinging platform; neither do I claim as such an adjustable raker's seat or platform; but

What I do claim herein as new, and desire to secure by Letters Patent, is—

The combination of the common supporting-beam $c$ with an adjustable raker's seat or stand, $e$, and platform A, when said parts are constructed and arranged in relation to each other so as to be easily adjusted to any desired position, and there firmly held while the machine is in operation and the raker on the platform, in the manner and for the purpose set forth.

GEO. ESTERLY.

Witnesses:
 R. T. CAMPBELL,
 G. E. FALCONER.